(12) United States Patent
Sheridan et al.

(10) Patent No.: US 8,199,763 B2
(45) Date of Patent: Jun. 12, 2012

(54) UNIVERSAL INTERNET TELEPHONE SYSTEM

(75) Inventors: Gaetan Sheridan, Repentigny (CA); Khaled Tewfik, Laval (CA); Mohamed Hamad, Montreal (CA); Pierre St-Germain, Montreal (CA)

(73) Assignee: babyTEL inc., Montreal (CA)

( * ) Notice: Subject to any disclaimer, the term of this patent is extended or adjusted under 35 U.S.C. 154(b) by 465 days.

(21) Appl. No.: 12/203,695

(22) Filed: Sep. 3, 2008

(65) Prior Publication Data

US 2010/0008480 A1   Jan. 14, 2010

Related U.S. Application Data

(60) Provisional application No. 61/079,609, filed on Jul. 10, 2008.

(51) Int. Cl.
*H04L 12/56* (2006.01)
(52) U.S. Cl. .................... 370/401; 709/227; 709/245
(58) Field of Classification Search .................... None
See application file for complete search history.

(56) References Cited

U.S. PATENT DOCUMENTS

| | | | | |
|---|---|---|---|---|
| 6,614,899 | B1* | 9/2003 | Sollee et al. | 379/218.01 |
| 7,480,723 | B2* | 1/2009 | Grabelsky et al. | 709/228 |
| 7,593,355 | B1* | 9/2009 | Surazski et al. | 370/261 |
| 7,656,878 | B2* | 2/2010 | Caballero-McCann et al. | 370/395.2 |
| 2004/0006623 | A1* | 1/2004 | Gourraud et al. | 709/227 |
| 2005/0094621 | A1* | 5/2005 | Acharya et al. | 370/352 |
| 2009/0141704 | A1* | 6/2009 | Eng et al. | 370/352 |
| 2009/0219920 | A1* | 9/2009 | Brandstatter | 370/352 |

OTHER PUBLICATIONS

Petrack & Conroy, Request for comments: 2848, "The PINT Service Protocol: Extension to SIP and SDP for IP Access to Telephone Call Services", Jun. 2000, [online], [retrieved on Oct. 24, 2008]. Retrieved from the Internet <URL: http//www.ietf.org/rfc/rfc2848.txt, 69 pages>.

JavaPhone API, undated, [online], [retrieved on Oct. 24, 2008]. Retrieved from the Internet <URL: http//java.sun.com/products/javaphone/index.jsp, one page>.

jSIP, undated, [online], [retrieved on Oct. 24, 2008]. Retrieved from the Internet <URL: http//jsip.sourceforge.net, two pages>.

* cited by examiner

*Primary Examiner* — Brian Roberts
(74) *Attorney, Agent, or Firm* — Benoît & Côté

(57) ABSTRACT

There is described a method for setting up a call over the Internet between a Web-based phone and a phone device. The Web-based phone is loaded on a Java-enabled computing device. The call involves a Web application hosted on an external server capable of communication with a SIP Server on which the Web-based phone is pre-registered. Upon request from the computing device, the external server sends an HTTP message to a SIP Switch which in turn forwards a SIP NOTIFY message to the computing device through the SIP Server. The Web-based phone then pops up on the computing device and the call initiation can be confirmed. There is also described a platform independent Web-based phone as well as a Web application for auto-populating a contact directory from contacts on a social networking Web site.

15 Claims, 8 Drawing Sheets

UNIVERSAL INTERNET TELEPHONE SYSTEM

CROSS-REFERENCE TO RELATED APPLICATIONS

This application claims priority under 35USC §119(e) of U.S. provisional patent application 61/079,609, filed Jul. 10, 2008 and entitled "Universal Internet Telephone System", the specification of which is hereby incorporated by reference.

TECHNICAL FIELD

The present description deals with telephony systems and methods and more particularly to VoIP (Voice over Internet Protocol) and Internet telephony.

BACKGROUND

Existing Internet Telephony Systems include systems described in:

Network Voice Protocol (NVP)—RFC 741 November 1977: Computer-to-computer real-time interactive voice communication.

Session Initiation Protocol (SIP)—RFC 2543 March 1999, RFC 3261 June 2002: Application-layer control for creating two-party, multiparty, or multicast sessions that include Internet telephone calls.

Similarly access to web applications via an Internet browser is technology that has been in the art for many years. The last specification for HTML, the predominant web page markup language, is the HTML 4.01 Recommendation published in December 1999 by the World Wide Web Consortium (W3C).

The Java language itself has been around since June 1991. The use of client software for making telephone calls over the Internet using a general purpose terminal device or computer has also been around for some time.

Skype launched the first public beta release of their application in August 2003. Earlier audio chat applications like Yahoo and MSN Messenger already existed at that time.

Java softphones have also been around for a while. Open source Java SIP libraries dating back to April 2002 can be found on Sourceforge http://sourceforge.net/projects/jsip.

As for the concept of a Universal System within the telephony domain, babyTEL Inc., formally Voice & Data Systems Inc., introduced its Universal Messaging System (UMS) in 1991. UMS was among the first telephony systems that ubiquitously interoperated with most Telephone Switches, PBXs and Key Systems.

Social networking sites on the Internet are also well-known. Facebook is a popular social networking site where anyone can sign up for free and create a profile that is visible by other users on the site. Once a person joins Facebook they are able to look up friends, classmates, coworkers, etc and add them as friends to their profile.

There are a number of other popular social networking sites that allow users to interact with friends and colleagues. In an initiative aimed at standardization and control of the list of site-specific APIs that developers must learn, Google launched OpenSocial. It defines a common API for social applications across multiple social websites. With OpenSocial developers can create applications that access multiple social networks that support the initiative. Among the websites implementing OpenSocial are Friendster, Hi5, Linkedin, MySpace, Orkut, etc.

Social network users connect with their friends via applications developed by the social network and other 3rd parties. Examples of such applications include media sharing (photo, video, etc), instant messaging, text postings, games, email, etc.

There is a need for improvements in IP telephony platforms; namely for a Web-based phone which is transportable between computing platforms, in the methods for setting up call using the Web-based phones and in the tools used in conjunction with the Web-based phone.

SUMMARY

The Universal Internet Telephone System, or UITS for short, allows users to connect in a real-time phone call via a single click without publishing their phone number or having to key-in someone else's phone number. In effect there need not be a real telephone number involved in the call.

According to an embodiment, UITS includes the capability for users to leave voicemail to their friends. This allows users to engage in non-real-time audio conversations, which is a much friendlier medium than email.

According to other embodiments, the UITS extends the 'intentional messaging' capability by allowing users to broadcast voicemail (e.g., a voice blast application) to multiple recipients at the same time.

According to yet other embodiments, the UITS comprises an auto-populated phonebook, which automatically lists all social network friends who have access to the Telephone application. Users can organize the phonebook directory by creating groups according to their preferences.

Embodiments that offer the phonebook directory may also provide 'presence' functionality so users can see when friends are available to take their calls.

When both users are at their computer, they can engage in a real-time Telephone conversation, which is typically friendlier than text chat and instant messaging.

Where text chat is desirable, some embodiments of the UITS allow users to engage in text chat.

Since UITS is a Web-based VoIP application users seamlessly communicate with friends across regional boundaries. This gives users a way to bypass long-distance charges and provides a cost saving value in this context. Indeed, UITS is an engaging application which adds value and utility to a social network user's experience.

There is described herein a method for setting up a call over the Internet between a Web-based phone and a phone device (Web-based or not). The Web-based phone is loaded on a Java-enabled computing device. The call involves a Web application hosted on an external server capable of communication with a SIP Server on which the Web-based phone is pre-registered. Upon request from the computing device, the external server sends a connect request to the SIP Server which in turn forwards a SIP NOTIFY message to the computing device. The Web-based phone then pops up on the computing device and the call initiation can be confirmed.

There is also described herein a platform-independent Web-based phone which is used in the call setup context described herein.

Also described herein is a Web application for auto-populating a contact directory from contacts on a social networking Web site.

It is to be noted that while the present application refers to the Java language (e.g., "Java-based", "Java-enabled", etc.), it is intended to encompass any other programming language which enables the functionalities necessary for the presently described methods and devices. The embodiments described herein are therefore not limited by the Java programming language.

According to an embodiment, there is described a method for setting up a call over the Internet between a Web-based phone and a phone device according to an embodiment of the invention. The Web-based phone is loaded on a computing device is pre-registered on a SIP Server. The method comprises: on the computing device, selecting a link indicative of the phone device to be called; using the link selection, preparing a message for requesting a call, the call request message comprising contact details of the phone device; preparing a SIP message using the contact details of the phone device; based on the preregistration of the Web-based phone, forwarding the SIP message to the computing device; the SIP message activating the Web-based phone on the computing device, the Web-based phone presenting the user with the possibility to confirm an initiation of the call to the phone device and thereby setting up the call.

According to another embodiment, there is described a Java-based program for a Web-based phone used by a first party for establishing a call with a phone device used by a second party. The Java-based program for loading on a Java-enabled computing device comprising a display screen, a microphone and a speaker. The computing device capable of communication with a SIP Server. The Java-based program stored on a computer-readable storage medium comprising computer-readable instructions for causing the computing device to perform the steps of: pre-registering the Web-based phone with the SIP Server; upon receipt of a SIP NOTIFY message by the computing device, displaying a graphical user interface on the display screen comprising an identification of the second party using the phone device receiving the call in the case of a SIP NOTIFY message or using the phone device making the call in the case of a SIP INVITE message and a "send" button to confirm connection of the call; controlling the use of the microphone during the call; and controlling the use of the speaker during the call.

According to another embodiment, there is described a Web application for a Web-based phonebook. The Web application for loading on a Web server. The Web application stored on a computer-readable storage medium comprising computer-readable instructions for causing the Web server to perform the steps of: obtaining, from a social networking Web site, a mobile phone directory, an external email server, or through an invitation to connect, contact details for phone devices of contacts associated to a user; auto-populating a contact directory, associated to the user, with the contact details; and upon request from an external Java-based computing device on which is loaded a Web-based phone, enabling access to the contact directory from the Web-based phone.

BRIEF DESCRIPTION OF THE DRAWINGS

Reference is now made to the accompanying Figures depicting aspects of the present description, in which.

DETAILED DESCRIPTION

The UITS is a telephone service/system designed for utilization with a Web-based phone loaded on any Internet connected terminal device for establishing a call with any phone device. According to an embodiment, the Internet connected terminal device is Java-enabled. "Phone device" is a broad expression which designates any equipment which allows a conversation between users; examples include cellular phones, regular PSTN phones, VOIP phones, wireless handheld devices like the Blackberry device, Personal Digital Assistants (PDAs) and personal computers. The Web-based phone is also included in the definition of a phone device.

The front-end enabling technologies of the UITS are the Web Application, referred to as the Telephone Web Application and the Web-based phone which is called, in one embodiment, the Eggphone application.

The Telephone Web Application resides on an external server and is described in detail herein.

The Eggphone application resides on any Java-enabled computing device and is described in detail herein.

To engage in a telephone conversation the user uses a computing device equipped with a speaker, a microphone, and a broadband Internet connection. According to other embodiments, the computing device also includes a display screen and/or any means for adapting the terminal device for use by the blind, deaf-mutes or persons having other disabilities.

According to an embodiment, the UITS maintains, for each user, a personal phone book, which may be accessed through the Telephone Web Application or the Eggphone application.

For installation of the Eggphone Application on the Java-enabled computer device, the user accesses the Telephone Web Application using a Java-enabled Internet browser. Using the Telephone Web Application, the user downloads the Eggphone application. Once the Eggphone application is loaded the user can make and receive calls or leave voicemail to other users. Calls can be initiated either via the Telephone Web Application or the loaded Eggphone application. In some embodiments of the service, the Eggphone application can be used exclusively to initiate calls without need for the browser or access to the website where the Telephone Web Application resides.

UITS calls are initiated and controlled using the Session Initiation Protocol (SIP). Calls can be between two Eggphone application instances, but may also be bridged to other types of phone devices via the VoIP network such that one end of the conversation is a voicemail system, a regular landline or a mobile phone.

When a user calls someone who is not available to answer the call, the call can be diverted to a voicemail system by a proprietary VoIP network and the caller will be able to record a voice message, which will be delivered to the recipient as an email attachment in Wave Audio file format.

The interactions between a user's Eggphone application and Telephone Web Application or between different instances of the Eggphone application belonging to different users are managed through the back-end technologies of the proprietary VoIP network, which utilizes SIP to originate and terminate VoIP calls and secure Web Services to communicate with the Telephone Web Application.

An objective of the UITS is to provide users ubiquitous access to telephony features and functions from any Java-enabled computing device.

There are many possible implementations of the Telephone Web Application and Eggphone application that embody the intent of the UITS. One example described herein is an application called Hotline-ME. Another example is an application called Telephone, which was developed for social networks like Facebook and those supporting the OpenSocial standards. Hotline-Me and Telephone are described in detail herein.

Figure 6:
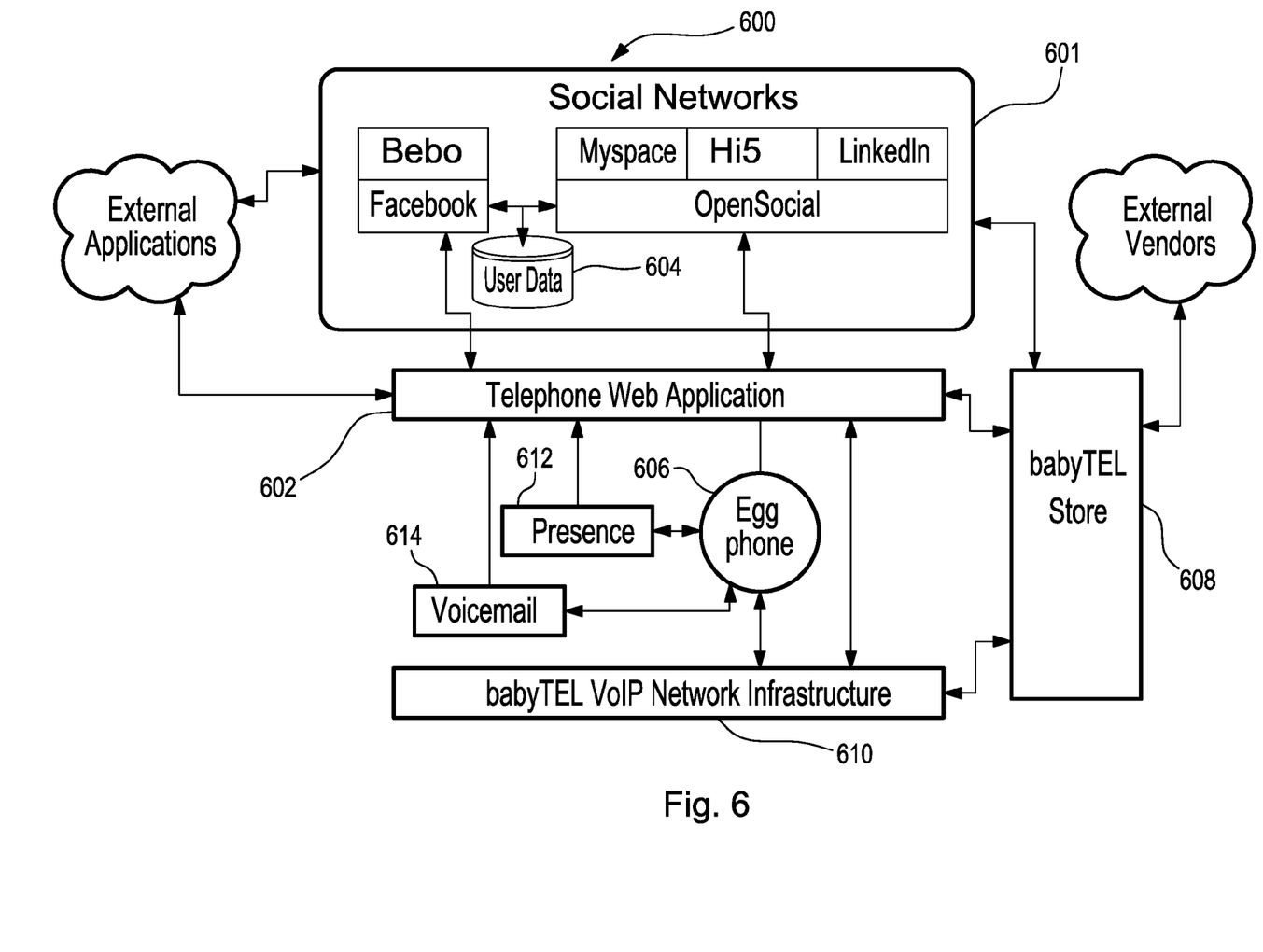
FIG. 6 is a block diagram which illustrates the functionalities of the Universal Internet Telephone System according to an embodiment of the invention.

FIG. 6 is a functional block diagram according to an embodiment of the Universal Internet Telephone System 600: the Telephone Web Application 602 is accessed through the one or more social networking sites 601. The social networking site holds information concerning its users in user database 604. This embodiment is sometimes referred to simply as Telephone. FIG. 6 shows the UITS 600 which comprises:
1. The Telephone Web Application 602 which was developed using the Social Network standards-based web services and associated methods for accessing and contributing social user data 604.
2. The Eggphone application 606 which is a SIP User-Agent (softphone client) developed in Java (i.e., the Web-based phone).
3. The proprietary VoIP network infrastructure 610 and associated services such as call routing, NAT traversal, voicemail, etc.
4. The Store 608 which may be on a separate server or may be part of proprietary VoIP network infrastructure 610, and which is accessible through the web and allows users to add paid services such as PSTN calling and custom skins or ring-tones.

The Telephone Web Application 602 runs from within the user's Social Network profile once it has been added by the user. It is hosted on a server within the proprietary VoIP network infrastructure 610 and served to the user's browser via HTTP.

To make use of the Telephone Web application 602, a Social Network user must add the application to his/her profile and then start the Telephone, which will load a widget called Eggphone application on the user's computing device. The Eggphone application is a Java webstart application which downloads and automatically loads. It is intended to work on any Internet-connected computing device (MAC, PC, Linux, etc.) that supports Java and is equipped with a speaker and a microphone.

Once loaded the Eggphone application 606 remains resident on the user's computing device and minimized in the system tray.

Figure 5:
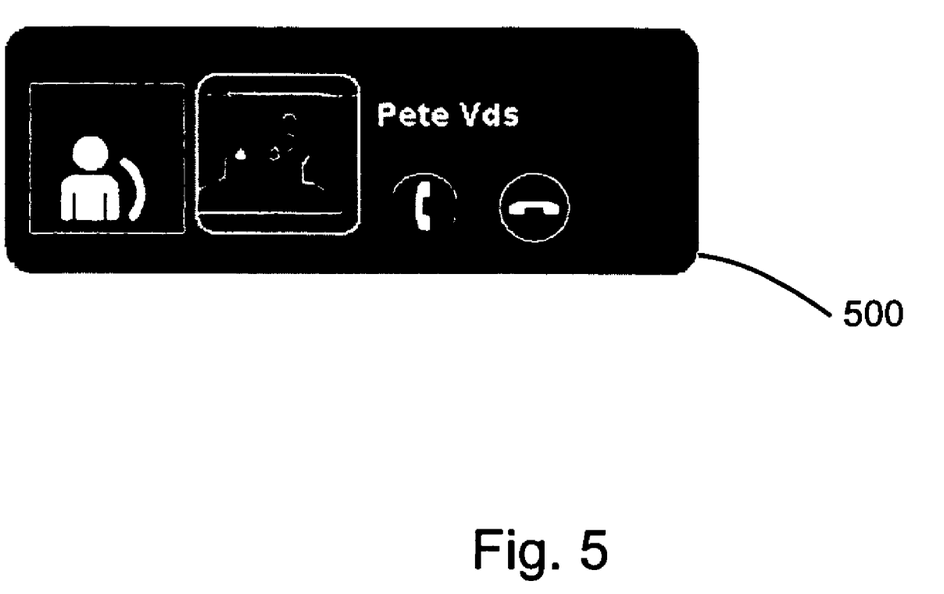
FIG. 5 is a schematic showing an Eggphone incoming pop-up displaying an alert advising the user of an incoming call.

When an incoming call arrives, the Eggphone application 606 displays an Eggphone incoming pop-up 500 (see FIG. 5) and gives the user the option to answer or let it go to voicemail.

To make an outgoing call the user clicks on an icon associated with the user he/she wants to call. This icon can be in someone's Social Network profile or in the caller's personal phone book, which is available via the Telephone Web Application 602 interface as well as on the Eggphone application 606. Once the user clicks the icon, his/her resident Eggphone application will display an Eggphone main pop-up with the called party name and Social Network picture showed. The user can then click the send button to complete the call or the hang-up button to cancel.

Figure 1:
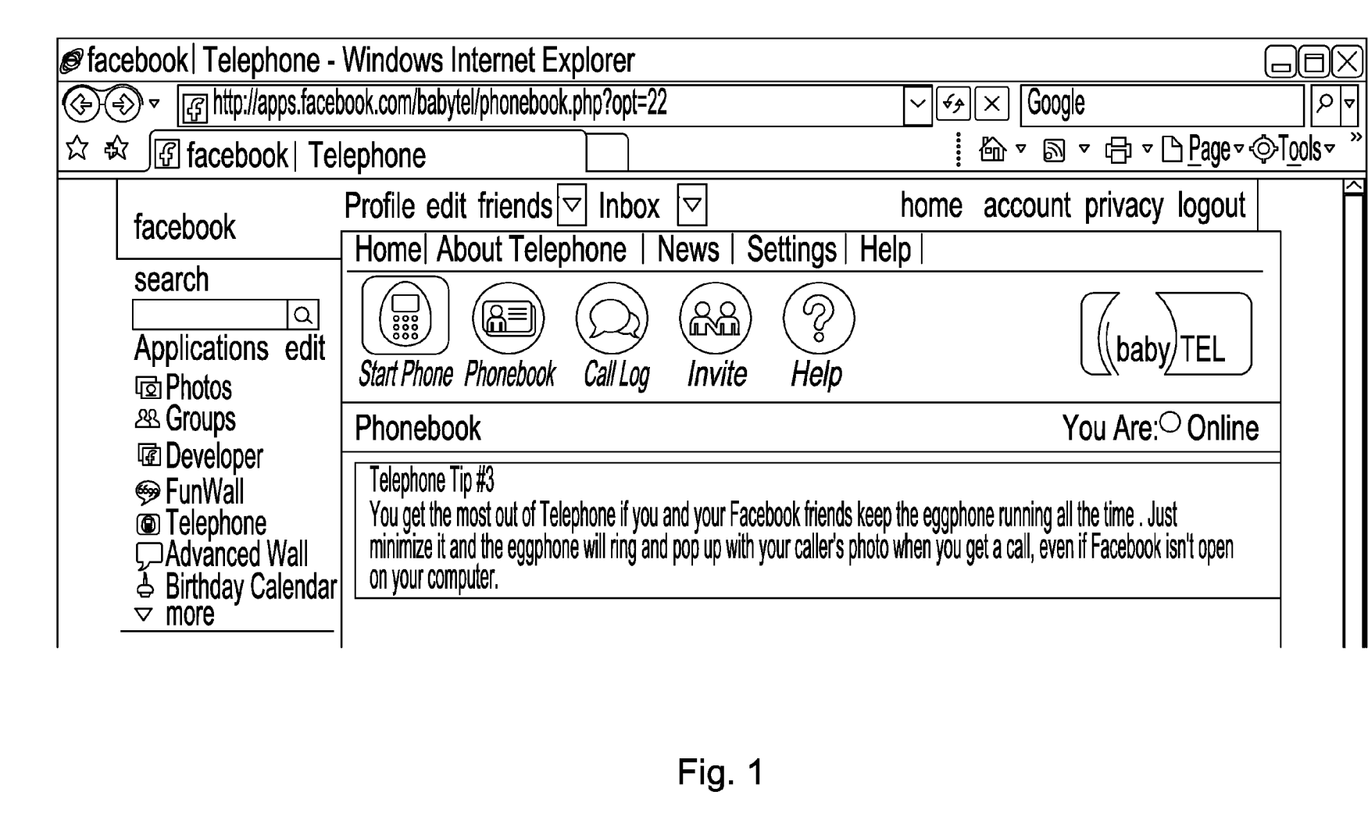
FIG. 1 is a Web page showing the Facebook social networking website screen in which is present a Telephone Web Application according to an embodiment of the invention.

Now turning to FIG. 1 there is shown a screenshot 100 of a user's computing device on which the Telephone Web 602 application is running. The Eggphone application 606 runs on the user's computer once it is downloaded via the Social Network Telephone Web Application 602. It communicates with the proprietary VoIP network 610 via SIP to make and receive calls.

Figure 2:
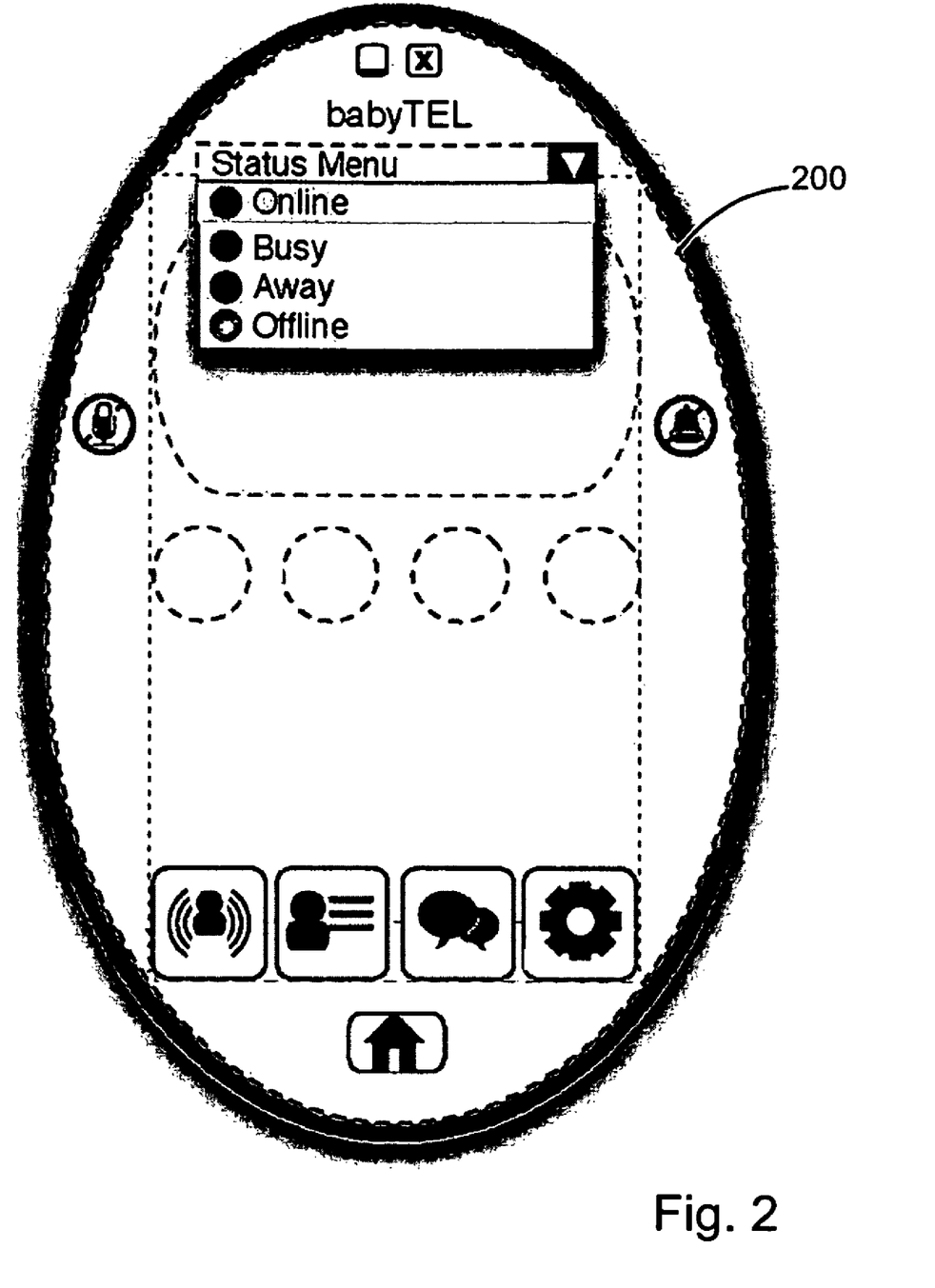
FIG. 2 is a schematic that illustrates an instance of the Eggphone main pop-up according to an embodiment of the invention.

Now turning to FIG. 2 there is illustrated an instance of the Eggphone main pop-up 200 which is ready for use.

Figure 3:
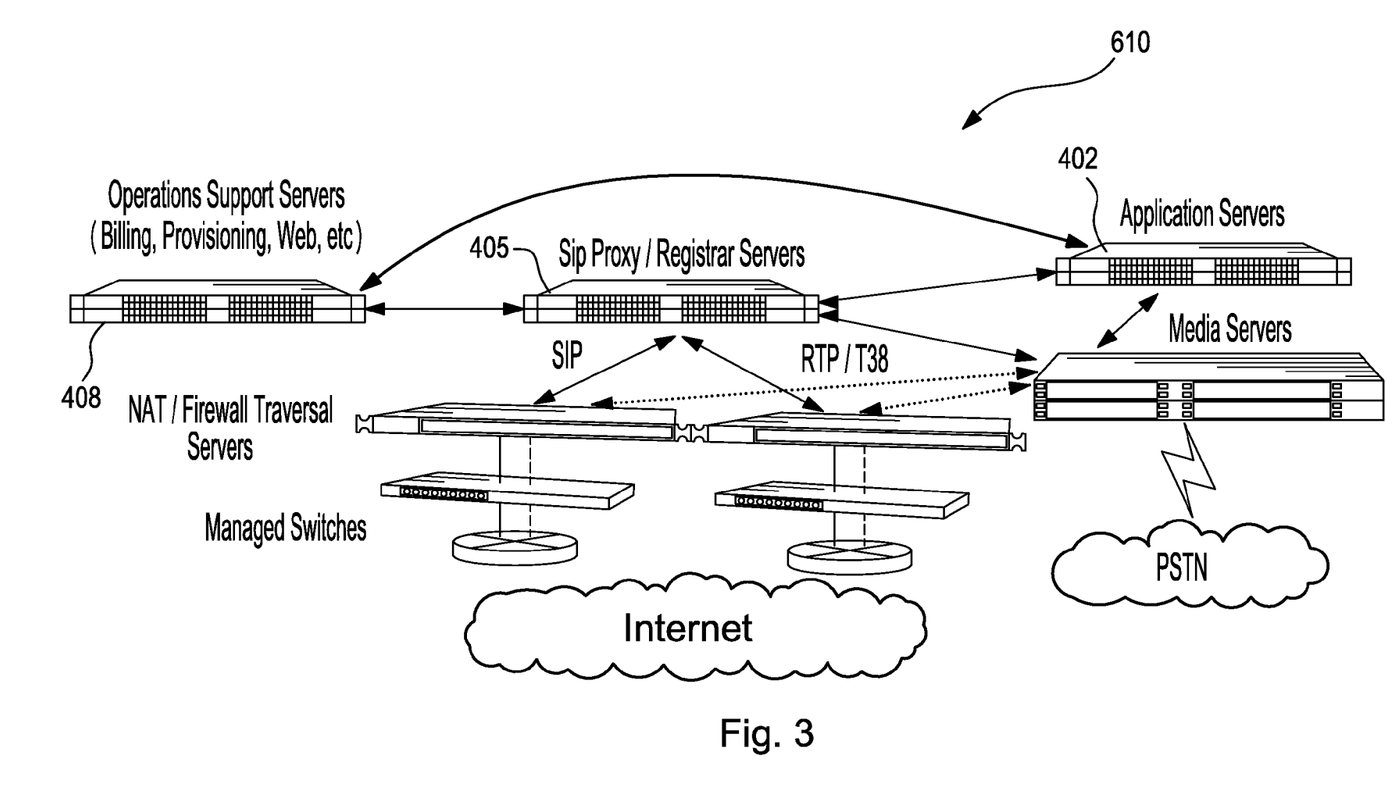
FIG. 3 is a block diagram that illustrates a VoIP network infrastructure according to an embodiment of the invention.

Now turning to FIG. 3 there is illustrated the proprietary VoIP network infrastructure 610. The proprietary VoIP network 610 transports SIP traffic between Eggphone end-points (not shown) (i.e., phone devices) as well as receive Call-Control commands from the Telephone Web Application on one of the Application servers 402. The SIP Proxy/Registrar Server 405 relays SIP messages which are sent to the user's Eggphone application while the Operations support servers 408, which include Web server 403, are necessary for the operation of the UITS.

Once the Eggphone application is invoked by the user it can remain resident and minimized in the system tray. In this way the user can receive telephone calls without needing the browser or having to be logged in to his/her Social Network profile.

If the user closes the Eggphone application and forces it to exit or turns off the computing device, his/her calls will automatically be diverted to the voicemail system 614 (see FIG. 6). This user will be able to receive calls again once he/she invokes the Eggphone application either through the Telephone Web Application in their Social Network profile or by the Eggphone application icon loaded on their computing device.

Since the Eggphone application allows the user to both make and receive calls, it can be used exclusively thus eliminating the need for a browser or access to the Social Network web site where the Telephone Web Application resides.

Figure 4:
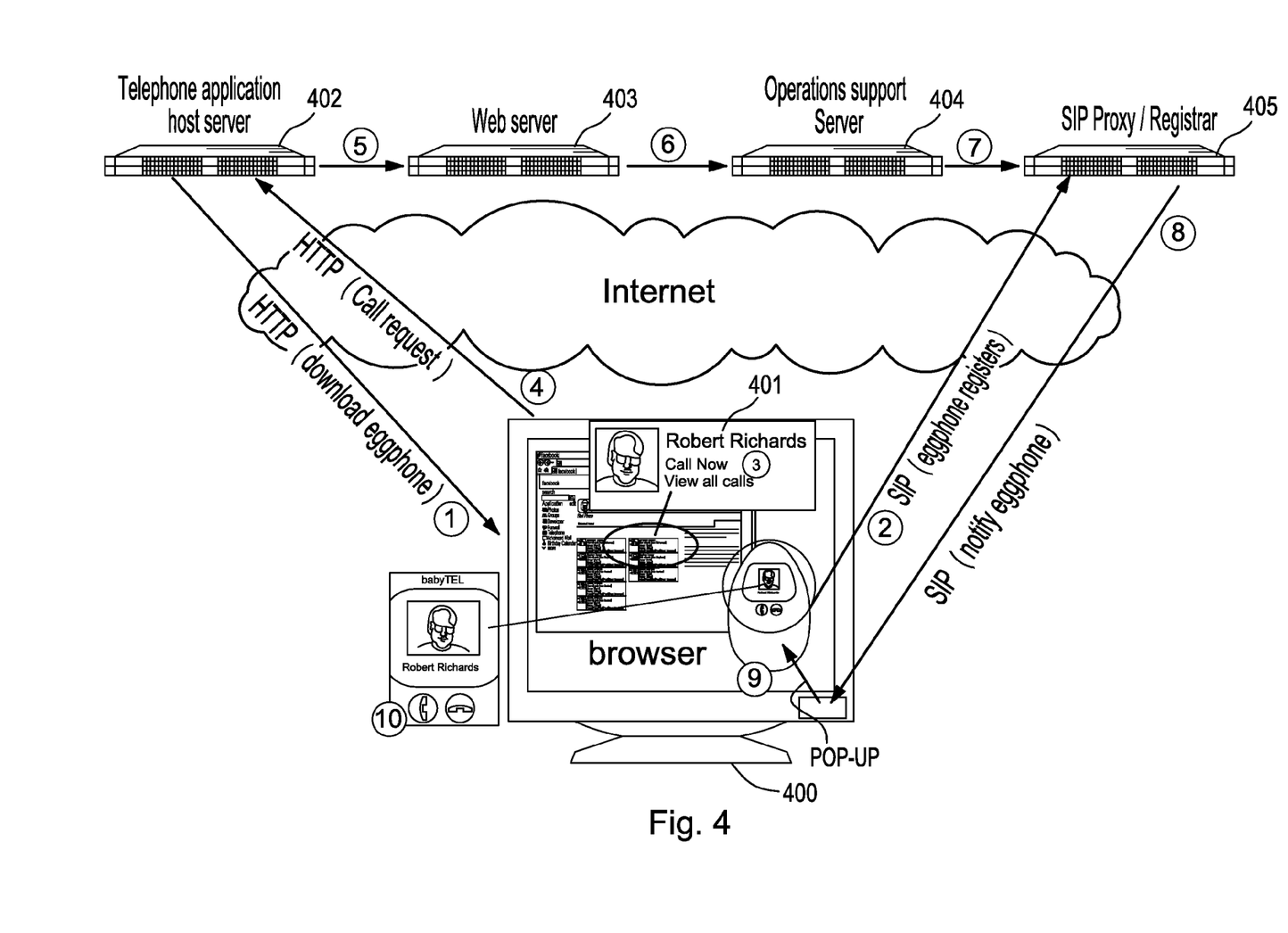
FIG. 4 is a block diagram providing an overview of the system architecture environment in which Web calls are made according to an embodiment of the invention.

Turning to FIG. 4 and to FIG. 6; one way for the user to initiate a call is by clicking on the Call Now link 401 appearing in the contact information box of his personal phone book available through the Telephone Web Application 602 residing on a Telephone Web Application host server 402. FIG. 1 shows a screen shot 100 of such a situation.

The steps of a method of setting up a call according to an embodiment of the invention are illustrated along with the system architecture shown in FIG. 4 and are described below.
1. After adding the Telephone Web Application 602 to his/her Social Network profile the user downloads the Eggphone application 606.
2. Once downloaded, the Eggphone application 606 sends a SIP registration message to the proprietary VoIP network 610.
3. The user clicks on the Call Now link 401 associated with a contact in his personal address book, in this case accessed via the Telephone Web Application 602.
4. The browser sends a call request in an HTTP message that is processed by the Telephone Web Application 602.
5. The Telephone Web Application 602 collects the contact details and sends this information in a connection request to a web server 403.
6. The web server 403 relays the connection request to a SIP switch 404.

7. The SIP switch 404 creates a SIP message (e.g., SIP NOTIFY) and forwards it to the SIP proxy 405 for relay to the user's Eggphone application.
8. The SIP proxy/registrar server 405 identifies the address of the user's registered Eggphone application and relays the SIP message to it.
9. The Eggphone application 606 receives the SIP message and pops-up an Eggphone incoming pop-up 500 (FIG. 5) with the display showing information about the intended called party.
10. The user clicks on the send button to complete the call or the hang-up button to cancel.

The Eggphone application 606, which must be running on the user's computer, registers with the proprietary VoIP network infrastructure 610 in order to be able to receive SIP messages.

The messages received by the Eggphone application 606 contains details about the contact the user wishes to call including their name, Social Network picture and SIP address. The messages also contain authentication parameters that are required to complete the call.

Once the Eggphone application 606 receives the call request it pops-up an Eggphone incoming pop-up 500 (FIG. 5) and presents the user with the contact information and the option to click the send button to start the call or hang-up button to cancel.

Once the user clicks the send button, the Web-based phone prepares and sends a SIP INVITE message to the SIP proxy/registrar 405. The SIP proxy/registrar 405 will call upon the SIP switch 404 to authenticate/authorize the requesting user. Once authorized the SIP INVITE is routed by the SIP proxy to the registered network address of the phone device being called. The call set up is then completed and eventually torn down according to the SIP signalling protocol.

Once a user initiates a call he/she uses the computer's speaker and microphone to converse with the other party.

To receive a call a user must have an instance of the Eggphone application 606 running on his/her computing device and be connected to the Internet. There is no need to be logged in to the Social Network account.

When the resident Eggphone application 606 receives a SIP INVITE, indicating an incoming call, there appears an Eggphone incoming pop-up 500 (FIG. 5) call alert in the form of a small dialog box showing who the caller is and providing options to answer or let it go to voicemail.

If the user clicks on the green send button the full Eggphone main pop-up 200 skin appears and the two parties are connected. If on the other hand the user does nothing or clicks on the red hang-up button, the call is diverted to the voicemail system 614.

Incoming calls are initiated by another user's Eggphone application 606 instance as described herein.

In another embodiment of the UITS (i.e., referred to earlier as Hotline-Me), the Telephone Web Application is accessed through a simple URL and its only function is to launch a browser that downloads and invokes the Eggphone application 606 to call a specific user. There is no personal phone book associated with this application. Instead each URL is associated with a specific user to be called via the Eggphone application 606.

The URL can be embedded in a web page, as part of a user's email signature, as a hyperlink in a document, within a contact's vCard or in any other place where a URL can be invoked. This URL links to a Telephone Web Application 602 hosted on a Web server 402 within the proprietary network 610.

Once the Eggphone application 606 launches the user clicks on the send button to initiate and set up the call as described herein. In this embodiment of the UITS, the called party has options for how to answer the call. For example, they can answer it on their Eggphone application 606 or another SIP device registered with the proprietary network 610, or they can have it forwarded to their landline, mobile phone or voicemail If the called party is not available to answer the call, the proprietary VoIP network 610 will divert that caller to voicemail system 614 where they will hear the called party's greeting and can leave them a voice message which will be delivered as a voice-to-email attachment.

When the conversation is finished, the caller clicks on the hang-up button, which causes the Eggphone application to terminate the call and exit.

Turning to FIG. 3, there is shown:
NAT Traversal servers;
SIP Proxy/Registrar servers;
Softswitch (routing, metering, etc);
Provisioning servers;
Telephone Web Application servers;
Voicemail servers;
Web servers;
VoIP Gateways (PSTN connectivity); and
Other operations support servers.

In addition, the following service elements are utilized outside the UITS:
User computing device with:
  a) Speaker & microphone;
  b) Broadband Internet connection;
  c) Java Virtual Machine; and
  d) Web browser;
Internet;
Telephone Web Application on Social Network (e.g. Facebook); and
Java SIP User Agent (Eggphone).

Figure 7:
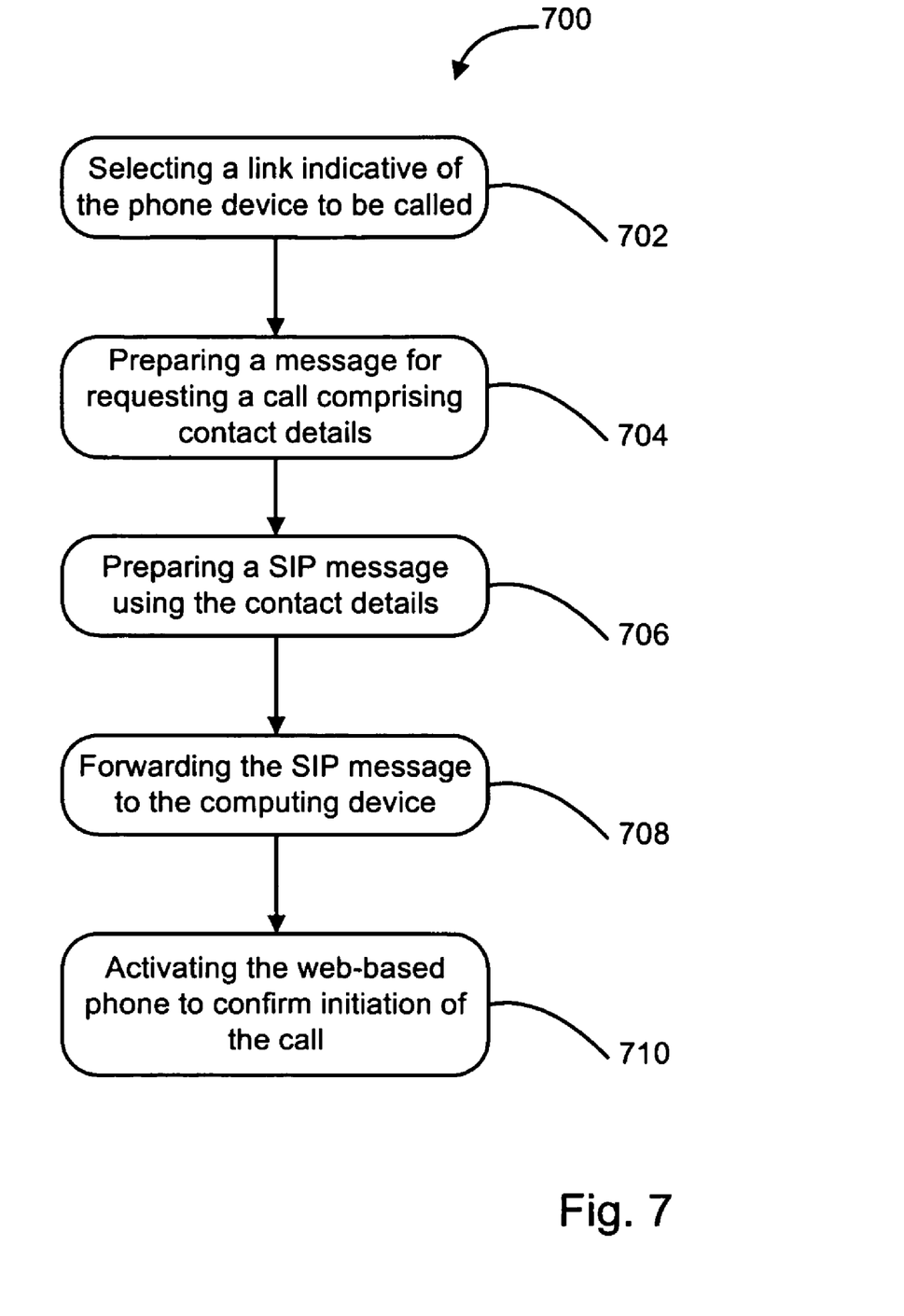
FIG. 7 is flow diagram which illustrates a method of setting up a call according to an embodiment of the invention.

Now turning to FIG. 7, there is described a method 700 for setting up a call over the Internet between a Web-based phone and a phone device according to an embodiment of the invention. The Web-based phone is loaded on a computing device is pre-registered on a SIP Server. Method 700 comprises: on the computing device, selecting a link indicative of the phone device to be called (step 702); using the link selection, preparing a message for requesting a call, the call request message comprising contact details of the phone device (step 704); preparing a SIP message using the contact details of the phone device (step 706); based on the preregistration of the Web-based phone, forwarding the SIP message to the computing device (step 708); the SIP message activating the Web-based phone on the computing device, the Web-based phone presenting the user with the possibility to confirm an initiation of the call to the phone device and thereby setting up the call (step 710).

The above description is meant to be exemplary only, and one skilled in the art will recognize that changes may be made to the embodiments described without department from the scope of the invention disclosed. Modifications which fall within the scope of the present invention will be apparent to those skilled in the art, in light of a review of this disclosure, and such modifications are intended to fall within the appended claims.

The invention claimed is:
1. A method for setting up a call over the Internet between a Web-based phone of a user and a phone device, the user of the Web-based phone having a personal contacts directory page on a social network web page, the Web-based phone being loaded on an Internet connected device and being registered on a Session Initiation Protocol (SIP) Server, the method comprising:
  a. on a computing device, the user using a browser to select a link on the personal contacts directory page of the user, the link being indicative of contact details of the phone device to be called and the identification of the user;
  b. using the link selection, preparing a call request message for requesting a call, the call request message comprising contact details of the phone device to be called and the identification of the user; and sending the call request message via Hypertext Transfer Protocol (HTTP) to a Telephone Web Application hosted on an external server;
  c. the Telephone Web Application creating and relaying a connection request message to an Operations Support Server, the connection request message comprising the contact details of the phone device to be called and the identification of the user, wherein the relaying comprises relaying the connection request message through a web server;
  d. the Operations Support Server creating a SIP NOTIFY message containing the contact details of the phone device to be called and the identification of the user; forwarding the SIP NOTIFY message to a SIP server;
  e. the SIP server identifying the address of the Internet connected device of the registered Web-based phone of the user, based on the registration of the Web-based phone and relaying the SIP NOTIFY message to the Internet connected device of the registered Web-based phone; and
  f. the SIP NOTIFY message activating the Web-based phone on the Internet connected device, the Web-based phone presenting the user with the possibility to confirm an initiation of the call to the phone device to be called and thereby setting up the call.

2. The method of claim 1, wherein the Internet connected device comprises a Java-enabled computing device.

3. The method of claim 2, wherein the Web-based phone used by the user for establishing a call with the phone device to be called and being used by a second party, is a Java-based program for loading on the Java-enabled computing device which comprises a display screen, a microphone and a speaker, the Java-enabled computing device capable of communication with a Session Initiation Protocol (SIP) Server, the Java-based program stored on a non-transitory computer-readable storage medium comprising computer-readable instructions for causing the computing device to perform the steps of:
  a. registering the Web-based phone with the SIP Server;
  b. upon receipt of a SIP NOTIFY message by the Java-enabled computing device, displaying a graphical user interface on the display screen comprising an identification of the second party using the phone device receiving the call and a send button to confirm connection of the call;
  c. controlling the use of the microphone during the call; and
  d. controlling the use of the speaker during the call.

4. The method of claim 3, wherein the Java-enabled computing device is further capable of communicating with an external server on which is loaded a Telephone Web application, the computer-readable instructions for causing the Java-enabled computing device to perform the additional step of accessing a contacts directory on the Telephone Web application.

5. The method of claim 1, wherein the step of relaying the SIP NOTIFY message to the Internet connected device is performed by the SIP server which uses the SIP NOTIFY message to forward the contact details of the phone device to be called to the registered Web-based phone running on the Internet connected device.

6. The method of claim 5, further comprising the Web-based phone preparing and sending a SIP INVITE message to the SIP server, the SIP server calling upon the Operations Support Server to authenticate/authorize the user.

7. The method of claim 6, further comprising the Web-based phone preparing and sending the SIP INVITE message to the SIP server once the user confirms initiation of the call.

8. The method of claim 1, further comprising the Telephone Web application presenting to the user the link indicative of the phone device to be called.

9. The method of claim 1, further comprising populating a contact directory with the contact details of a plurality of phone devices of contacts associated to the user of the Web-based phone, the contact directory being accessed through the Telephone Web Application.

10. The method of claim 9, further comprising obtaining, from a social networking Web site, a mobile phone directory, an external email server, or through an invitation to connect, the contact details; and auto-populating the contact directory with the contact details.

11. The method of claim 1, further comprising the Web-based phone presenting the user with at least a part of the contact details for confirming the identity of a user of the phone device.

12. The method of claim 1, wherein the phone device comprises a voice mailbox associated to a user of the phone device, whereby the user of the Web-based phone selects a button on the Web-based phone to send voicemail to the voice mailbox associated to the user of the phone device instead of requesting a connection to the phone device.

13. The method of claim 1, wherein the phone device comprises a plurality of voice mailboxes associated to a corresponding plurality of phone devices associated to corresponding users.

14. The method of claim 1, wherein the Web-based phone issues a request to the web server on which is loaded a Telephone Web application for a Web-based contacts directory the Telephone Web application stored on a non-transitory computer-readable storage medium comprising computer-readable instructions for causing the Web server to perform the steps of:
  a. obtaining, from a social networking Web site, contact details for phone devices of contacts associated to a user;
  b. auto-populating a contact directory, associated to the user, with the contact details; and
  c. upon receipt of the request from the Web-based phone, enabling access to the contact directory from the Web-based phone.

15. The method of claim 14, wherein the obtaining further comprises obtaining the contacts details from a mobile phone directory, an external email server, or through an invitation to connect.

* * * * *